(12) United States Patent
Ung

(10) Patent No.: US 6,785,534 B2
(45) Date of Patent: Aug. 31, 2004

(54) PREPAID/POSTPAID AUTOMATIC CHANGE OF PAYMENT OPTION

(75) Inventor: Dara Ung, Odenton, MD (US)

(73) Assignee: TeleCommunications Systems, Inc., Annapolis, MD (US)

( * ) Notice: Subject to any disclaimer, the term of this patent is extended or adjusted under 35 U.S.C. 154(b) by 513 days.

(21) Appl. No.: 09/832,011

(22) Filed: Apr. 11, 2001

(65) Prior Publication Data

US 2003/0069840 A1 Apr. 10, 2003

Related U.S. Application Data

(60) Provisional application No. 60/196,095, filed on Apr. 11, 2000.

(51) Int. Cl.[7] .............................. H04Q 7/32; H04Q 7/20
(52) U.S. Cl. ....................... 455/406; 455/407; 455/408; 455/403; 379/114.2; 379/114.15; 379/114.01; 379/114.03; 379/114.17
(58) Field of Search ................................. 455/403, 406, 455/407, 408, 426.1, 422.1, 414.1, 414.2, 433, 432.1, 432.3, 517, 500; 379/144.01, 114.01, 114.03, 114.05, 114.09, 114.15, 114.16, 114.17, 114.2, 114.29, 115.01, 127.01, 127.03, 127.05

(56) References Cited

U.S. PATENT DOCUMENTS

| | | | |
|---|---|---|---|
| 5,440,621 A | * | 8/1995 | Castro ........................ 379/121 |
| 6,373,930 B1 | * | 4/2002 | McConnell et al. ........ 455/406 |
| 6,393,269 B1 | * | 5/2002 | Hartmaier et al. .......... 455/406 |
| 6,529,593 B2 | | 3/2003 | Nelson .................... 379/114.2 |
| 2003/0086548 A1 | * | 5/2003 | Nelson .................. 379/144.01 |

* cited by examiner

*Primary Examiner*—William Trost
*Assistant Examiner*—Keith Ferguson
(74) *Attorney, Agent, or Firm*—William H. Bollman

(57) ABSTRACT

A prepaid/postpaid reconfiguration logic module in a service control point (SCP) of a wireless network allows a subscriber to a prepaid wireless service to change payment options between prepaid and postpaid without requiring assistance from a customer care representative. Standard wireless intelligent network (WIN) messaging is used to change from a previously selected prepaid or postpaid payment option, allowing the new option to be applied to their wireless phone account before or after any or all usages (i.e., as frequently as on a call-by-call basis). Preferably, a subscriber is given the opportunity to change the prepaid/postpaid payment option not only before but also after each usage of the relevant mobile device. Changes between prepaid and postpaid payment options substantially immediately affect a real time change in the payment mode of the subscriber.

18 Claims, 6 Drawing Sheets

Prepaid/Postpaid WIN Network Architecture

Prepaid/Postpaid WIN Network Architecture

Prepaid to Postpaid Change of Subscriber Class

Option 1 - Postpaid to Prepaid Change of Subscriber, RUIDIR Method

Option 2 - Postpaid to Prepaid Change of Subscriber, IP Method

PREPAID/POSTPAID AUTOMATIC CHANGE OF PAYMENT OPTION

This application claims priority from U.S. Provisional Application No. 60/196,095, filed Apr. 11, 2000, entitled "Prepaid/Postpaid Automatic Change of Payment Option", to Dara Ung, the entirety of which is expressly incorporated herein by reference.

BACKGROUND OF THE INVENTION

1. Field of the Invention

This invention relates generally to wireless carriers, Internet service providers (ISPs), and information content delivery services/providers. More particularly, it relates to Wireless Telecommunication, ANSI-41D Wireless Intelligent Network (WIN) applications and prepaid applications.

2. Background of Related Art

In recent years, the telecommunication industry has seen an explosive growth both in the number of the types of services offered and in the number of service providers. Among those numerous services now being offered, prepaid call service may be one of the fastest growing segments in the telecommunication industry today.

As the name implies, a prepaid call service allows a customer of the service to pay in advance for the use of the provider's network resources in making a telephone call. The prepaid call service provides, among other things, an alternative option for a telephone user who might otherwise not be able to obtain the traditional postpaid telephone services because, e.g., of a bad credit rating, or of being in a geographical area where post paid service is unavailable.

The world-wide prepaid call services market is projected to grow tremendously in the next few years, fueling a frenzy among service suppliers to quickly add prepaid service to the list of services they already offer.

Currently no simple system is known to allow a user to themselves select pre-paid service using a standard WIN approach. Conventionally, prepaid services require a modification to the subscriber's profile stored in a home location register (HLR). Existing solutions are typically non-standardized, inflexible approaches and/or require intervention by a customer care representative or other person representing the service provider. The conventional approaches are labor intensive and ultimately expensive.

There is a need for a technique and architecture which allows a subscriber to themselves change service to a particular mobile device between postpaid and prepaid on a substantially real-time basis, allowing frequent postpaid/prepaid changes to the mobile device (e.g., on a call-by-call basis), preferably using standard WIN messages and commands.

SUMMARY OF THE INVENTION

A method of allowing a wireless device to change its prepaid payment mode substantially in real-time in accordance with the principles of the present invention comprises provisioning at least one trigger in a wireless subscriber profile file relating to a prepaid mode for the wireless device. To switch payment modes, the at least one trigger is removed from the wireless subscriber's profile file in response to keyed input from the wireless device. The provisioning and the removing steps may each be performed without customer representative intervention.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

For simplicity and illustrative purposes, the principles of the present invention are described by referring mainly to voice calls over the public switched telephone network (PSTN), using the Signaling System 7 (SS7) protocol terminology. However, one of ordinary skill in the art would readily recognize that the same principles are equally applicable to and can be implemented in any network (e.g., in a wireless intelligent network for voice and/or data communication) using other suitable standards and/or other suitable protocols.

The present invention allows a subscriber to a prepaid wireless service to change payment options between prepaid and postpaid without requiring assistance from a customer care representative. The present invention utilizes wireless intelligent network (WIN) messaging to change from a previously selected prepaid or postpaid payment option, allowing the new option to be applied to their wireless phone account before or after any or all usages (i.e., as frequently as on a call-by-call basis). Preferably, a subscriber is given the opportunity to change the prepaid/postpaid payment option not only before but also after each usage of the relevant mobile device.

The inventive solution preferably uses WIN standard messages and prepaid/postpaid reconfiguration logic module to switch a subscriber's account between prepaid and postpaid.

Figure 1:
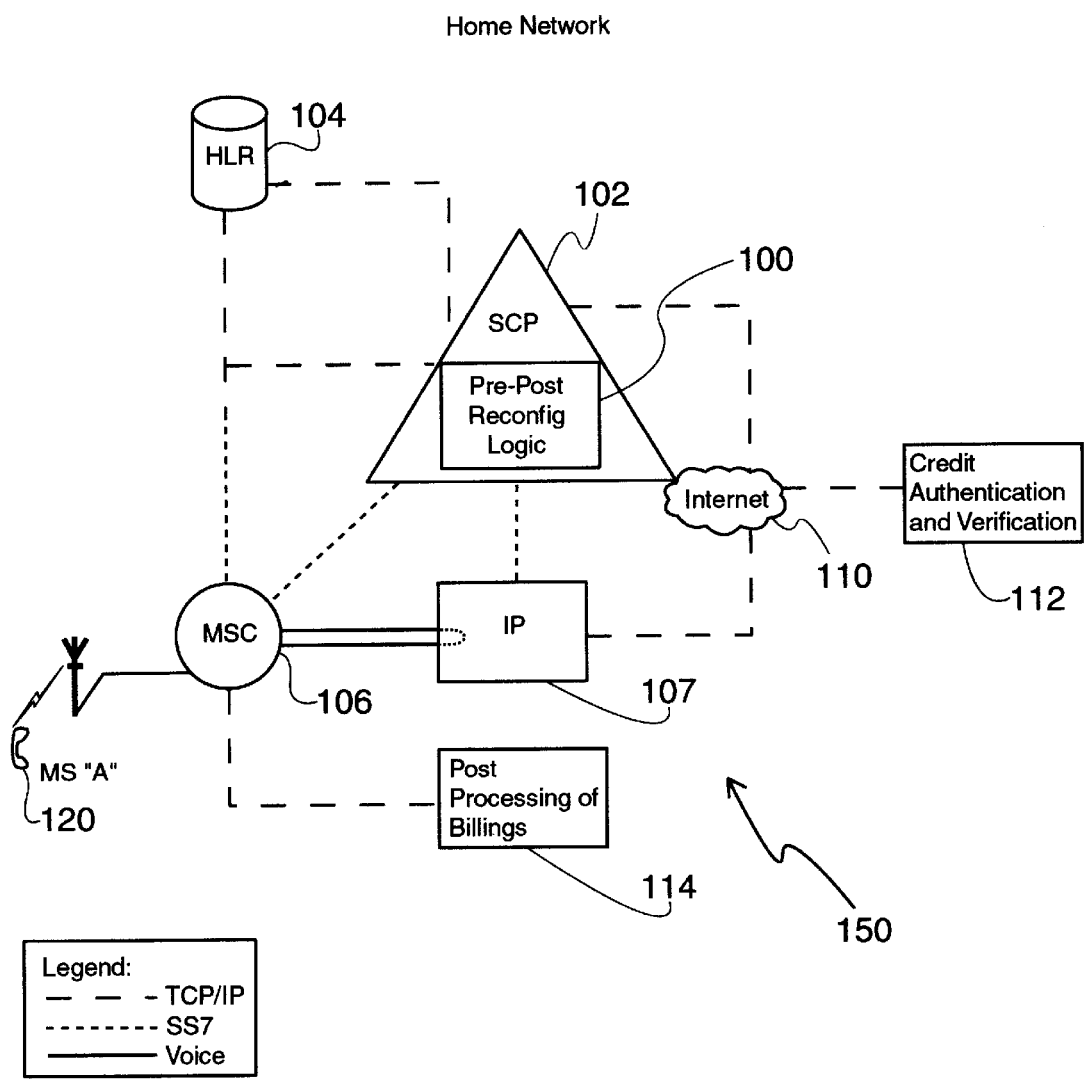
FIG. 1 shows an exemplary network architecture allowing a subscriber to change between a prepaid and a postpaid option on a call-by-call basis, in accordance with the principles of the present invention.

FIG. 1 shows an exemplary WIN network architecture allowing a subscriber to change between a prepaid and a postpaid option on a call-by-call basis, in accordance with the principles of the present invention.

In particular, as shown in FIG. 1, a mobile device 120 is serviced by their home wireless network 150 and provided with the ability to switch between prepaid and postpaid payment options substantially in real-time. The wireless network 150 includes a mobile switching center (MSC) 106 including an Intelligent Peripheral (IP) 107 connected to the SCP via the Internet 110 or SS7 network. The home wireless network 150 also includes a home location register 104, and a service control point (SCP) 102. Post processing of billings is provided by an appropriate post processings of billings module 114, and credit authentication and verification (for prepaid applications) is provided by an appropriate credit authentication and verification module 112, accessed via the Internet 110.

Importantly, the SCP 102 includes a prepaid/postpaid reconfiguration logic module 100, which detects payment mode change requests from the subscriber 120, and initiates reconfiguration of the subscriber's account in the HLR 104 to substantially immediately affect in real time the change in payment mode of the subscriber 120.

Figure 2:
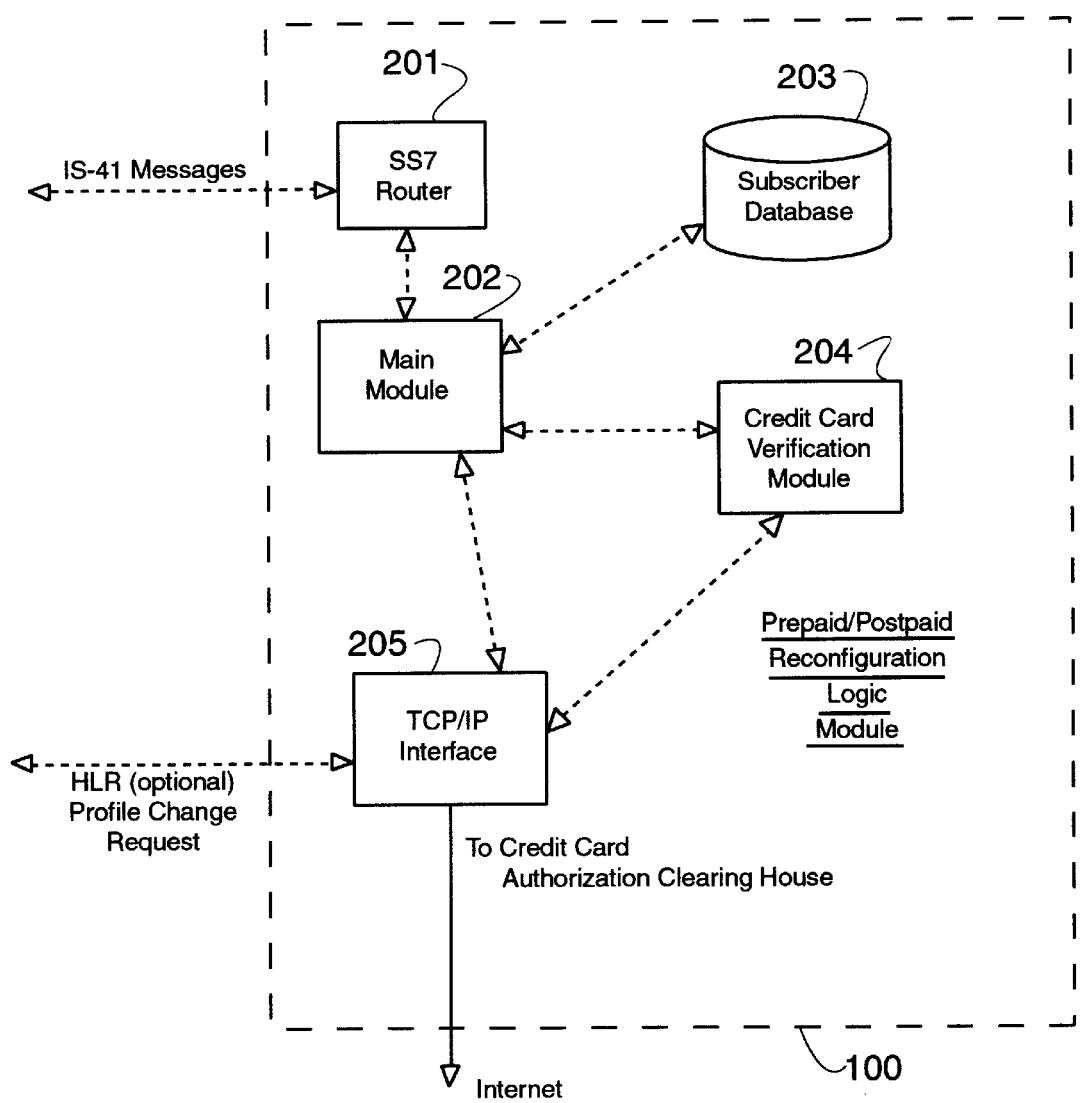
FIG. 2 shows in more detail the prepaid/postpaid reconfiguration logic module of the SCP, in accordance with a disclosed embodiment of the present invention.

FIG. 2 shows in more detail the prepaid/postpaid reconfiguration logic module 100 of the SCP 102, in accordance with a disclosed embodiment of the present invention.

In particular, as shown in FIG. 2, the prepaid/postpaid reconfiguration logic module 100 includes a main module 202, a signaling system No. 7 (SS7) router 201, and a subscriber database 203. The main module 202 communicates with a TCP/IP interface 205, and with a credit card verification module 204.

The SS7 router 201 processes SS7 and IS-41 messages from/to the MSC 106 and the HLR 104. The SS7 router 201 interfaces with the main module 202 to access the subscriber database 203.

The main module 202 controls call processing. The main module 202 receives and sends IS-41 based messages from the SS7 router 201, reads and writes subscriber information to the subscriber database 203, requests credit card authorization, and interfaces with the TCP/IP interface 205.

The subscriber database 203 stores subscriber states, the class of service, and other relevant information pertinent to the mobile device 120.

The credit card verification module 204 accepts credit card check requests from the main module 202, sends requests to the TCP/IP interface 205, and waits for authorization results.

The TCP/IP interface 205 interfaces to the HLR 104 (if a TCP/IP option is used) to request a subscriber's profile update in the HLR 104. The TCP/IP interface also sends credit card authorization requests to an appropriate application on the Internet.

Figure 2A:
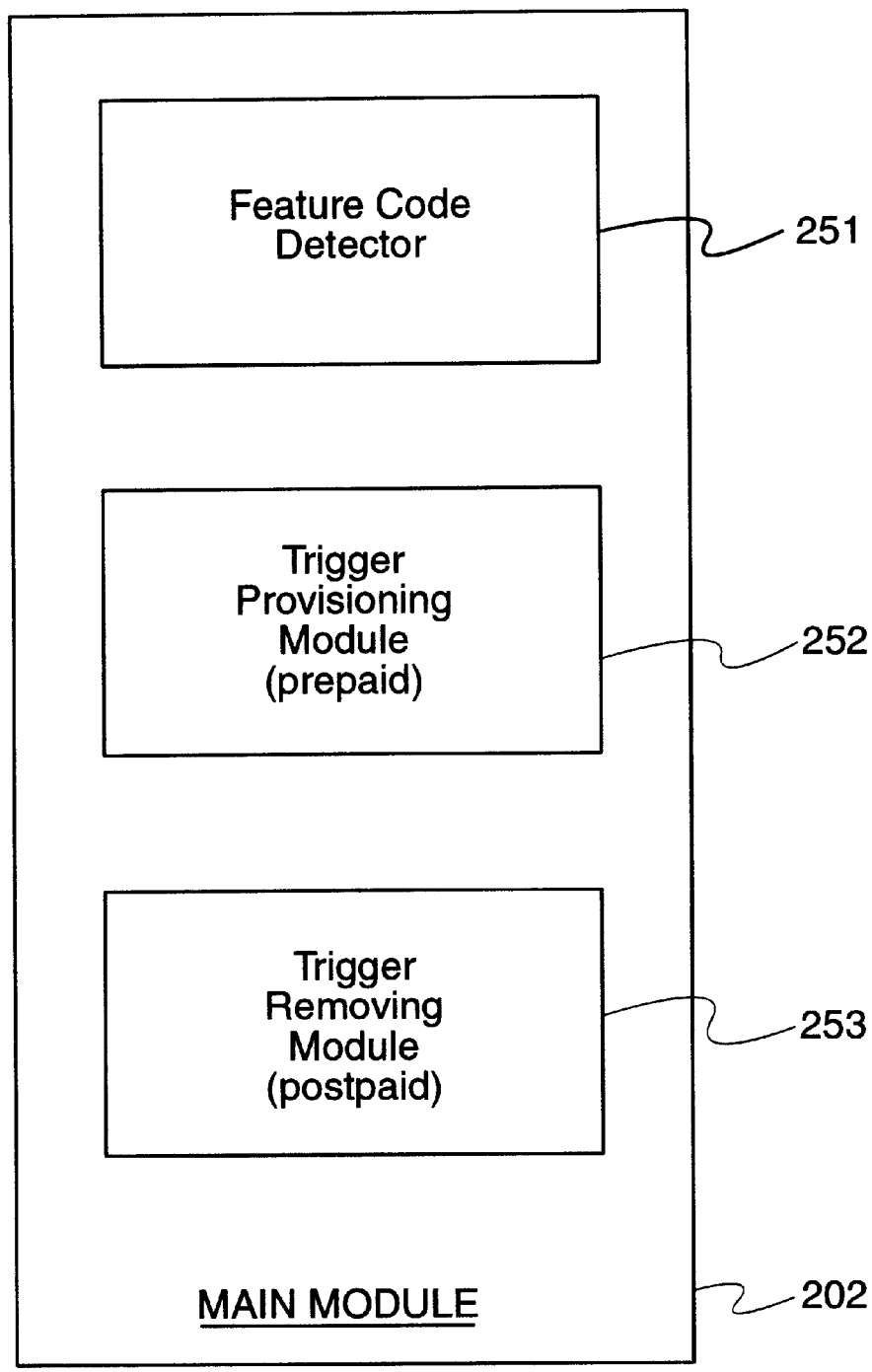
FIG. 2A shows in yet more detail descriptive modules of an exemplary prepaid/postpaid reconfiguration module, in accordance with the principles of the present invention.

FIG. 2A shows in yet more detail descriptive modules of an exemplary prepaid/postpaid reconfiguration module, in accordance with the principles of the present invention.

In particular, as shown in FIG. 2A, the main module 202 of the prepaid/postpaid reconfiguration logic module 100 may include a feature code detector module 251, a trigger provisioning module 252 operable to activate a prepaid mode for a particular wireless device 120, and a trigger removing module 253 operable to activate a postpaid mode for the wireless device 120.

In operation, at the start of the service, the subscriber of the mobile device 120 chooses either a prepaid or postpaid payment option. This chosen payment option is applied to all subsequent calls by or to the subscriber, until changed.

The prepaid payment option is preferably provisioned in the HLR 104 with appropriate prepaid triggers, e.g., with an Origination Trigger having type "All Calls", an Advanced Termination Trigger, and other prepaid related triggers such as call answer and call disconnect triggers. If postcall payment is selected, the postpaid option is provisioned with the origination trigger having a dialed digits trigger type without requiring provision of other prepaid triggers, e.g., as mentioned above.

At any subsequent time, when the subscriber wishes to change their payment option, e.g., from prepaid to postpaid, a prepaid feature code (FC) may be dialed on the mobile device 120, followed by a SEND button. The feature code will first be received by the Service Control Point (SCP) 102 in the wireless network 150 including the prepaid/postpaid reconfiguration logic module 100. The prepaid/postpaid reconfiguration logic module 100 may be integrated with an appropriate prepaid application residing on the SCP 102, or may be a separate software package.

In the disclosed embodiment, the prepaid/postpaid reconfiguration logic module 100 sends a request to the subscriber's HLR 104 to affect the real-time payment option change. For instance, if changing from prepaid to postpaid, the above-mentioned prepaid triggers are replaced with an Origination Trigger having a dialed digits trigger type, e.g., "Single Introduced Star", to convert the relevant subscriber 120 to a postpaid payment option.

The HLR 104 in turn sends a request to a VLR to update the relevant subscriber's profile, e.g., to postpaid.

Subsequent calls to or from the relevant subscriber 120 will be thereafter processed as postpaid calls. Thus, if the postpaid payment option is selected before placement of a particular telephone call, the telephone call thereafter made will utilize the recently selected postpaid payment option.

Preferably, standard call detail records are generated, periodically collected, and sent to the post billing processing device 114 in an otherwise conventional manner.

To change back to prepaid service, the subscriber 120 need merely to perform a similar sequence, toggling service from the current payment mode (e.g., postpaid) back to the alternate payment mode (e.g., prepaid).

All communication messages used to transmit the prepaid/postpaid payment mode change preferably conform to ANSI-41, as defined in the IS-771 standard.

Prepaid to Postpaid Change of Subscriber Class

Figure 3:
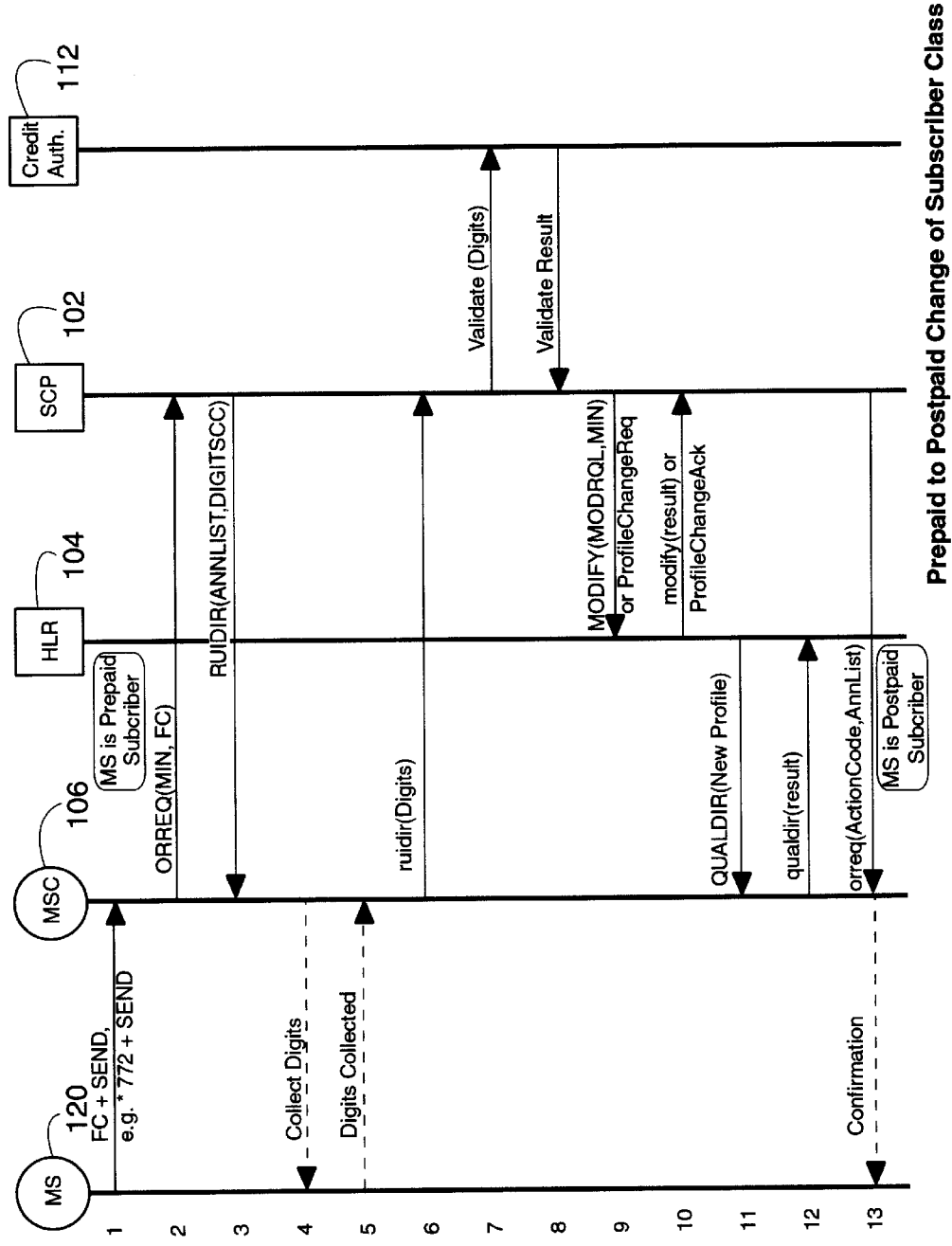
FIG. 3 shows an exemplary call flow for changing a subscriber's class from prepaid to postpaid, in accordance with the principles of the present invention.

FIG. 3 shows an exemplary call flow for changing a subscriber's class from prepaid to postpaid, in accordance with the principles of the present invention. It is assumed that the subscriber 120 has been provisioned with a prepaid option prior to the call process shown in FIG. 3.

(Message 1) The prepaid subscriber wishes to switch to postpaid and dials a FC code, e.g. *771, and presses SEND.

(Message 2) Since the prepaid subscriber has been provisioned with an "All Call" Origination Trigger, an ORREQ message is then launched to the SCP 102.

(Message 3) The prepaid/postpaid reconfiguration logic module 100 recognizes the FC and starts to process the payment mode change request. The prepaid/postpaid reconfiguration logic module 100 formulates an ANSI-41 RUIDIR message and sends it to the MSC 106 with the following parameters:

ANNLIST: Appropriate announcement to prompt the subscriber 120 for credit information, e.g. "Please enter your credit card number".

DIGICC: Digits Collection control, e.g. 16 digits.

(Message 4) At the reception of the RUIDIR message, the MSC 106 plays the announcement and waits for input from the subscriber 120.

(Message 5) The subscriber 120 enters the requested digits.

(Message 6) The MSC 106 acknowledges receipt of the RUIDIR message to the SCP 102 with the collected digits. Messages 3 to 6 can be repeated until all information is collected.

(Message 7) The prepaid/postpaid reconfiguration logic module 100 may verify credit information for the subscriber 120 by sending the collected digits to the Credit Authentication and Verification computer 112, e.g., over a secured internet interface.

(Message 8) The Authentication and Verification computer 112 validates the number and replies to the SCP 102 with a result.

(Message 9) If credit validation is successful, the prepaid/postpaid reconfiguration logic module 100 sends a profile change request message—such as the ANSI-41 MODIFY, or other message (even a proprietary message)—to the HLR 104. The profile change request message preferably replaces in the subscriber's profile the prepaid triggers with postpaid control parameters, e.g., replaces the Origination Trigger Type "All Call" with a Trigger Type "Single Introduced Star". The profile change request message also preferably removes the Advanced Termination Trigger as well as other prepaid related triggers from the subscriber's profile.

(Message 10) The HLR 104 processes the change request and acknowledges the SCP 102 with a modify return result message, in the case of ANSI-41, or with another profile change acknowledgement message in the case of a proprietary TCP/IP or other type message. At the reception of the response, the SCP 102 has the option to delete the subscriber record from the database.

(Message 11) The subscriber profile changes cause the HLR 104 to send an ANSI-41 QUALDIR message to the MSC (VLR) 106 with an updated subscriber profile.

(Message 12) The MSC 106 updates the VLR with the new subscriber profile and responds with a QUALDIR return result message. Substantially immediately thereafter, and from then on, all calls from and to the subscriber 120 will be processed as a postpaid call.

(Message 13) The inventive solution formulates an ORREQ return result standard IS-41 message with an appropriate announcement and result (accepted or denied), and sends it to the MSC 106. The announcement may be played to the subscriber 120. At that point, connection between the mobile device 120 and the wireless network 150 is terminated.

Since the whole process (from Message 2 to Message 13) can be long, it may be necessary to inform the MSC of the update status, to avoid ORREQ timer expiration. To avoid this problem, a RESETTIMER message can be sent periodically during this time.

Option 1—Postpaid to Prepaid Change of Subscriber Class, RUIDIR Method

Figure 4:
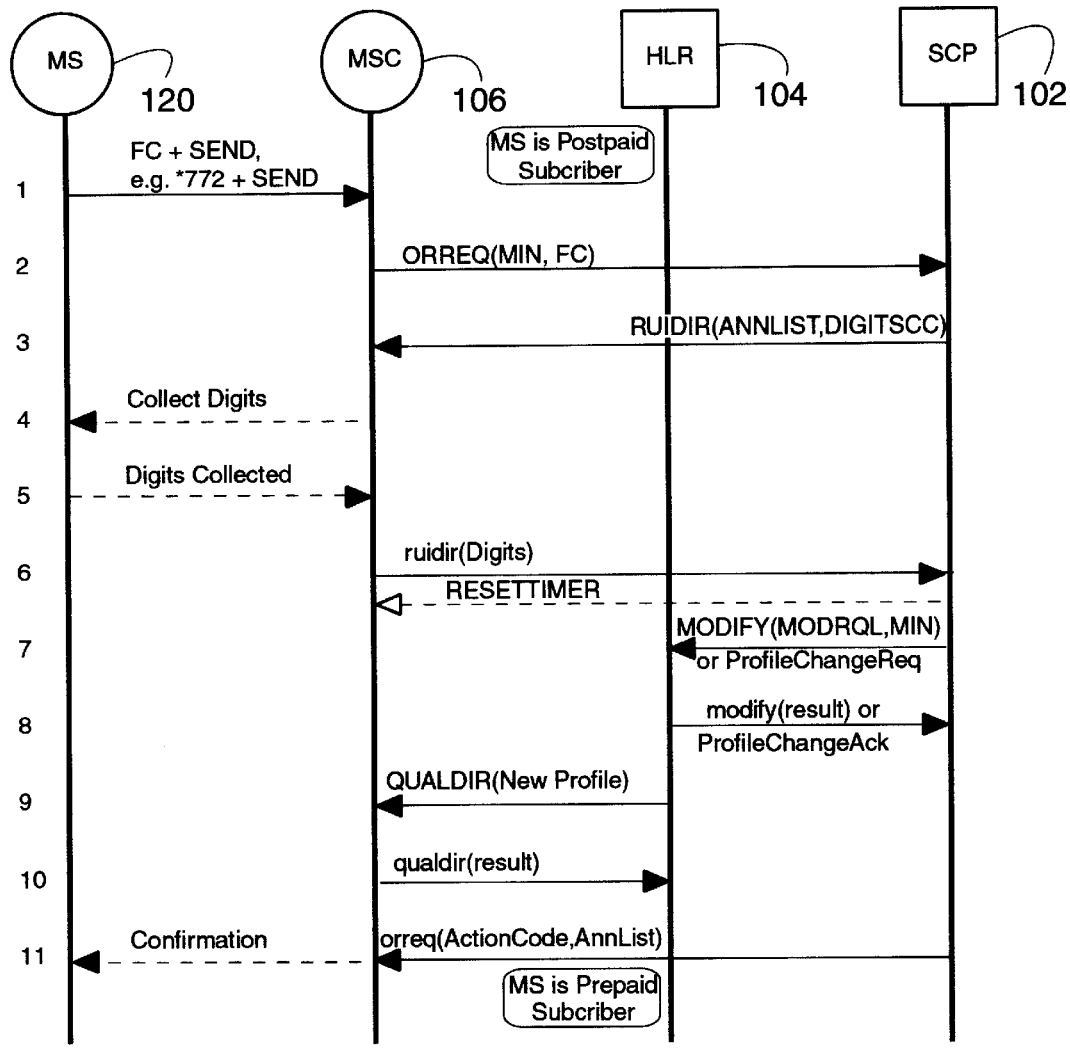
FIG. 4 shows a first embodiment of a call flow for changing a subscriber's class from postpaid to prepaid, in accordance with the principles of the present invention.

FIG. 4 shows an exemplary call flow for changing a subscriber's class from postpaid to prepaid, in accordance with the principles of the present invention.

In FIG. 4, it is assumed that the subscriber 120 has been provisioned with a postpaid option prior to the call process. This scenario also assumes that the SCP 102 still contains the subscriber profile previously provisioned as prepaid but which was subsequently switched to postpaid.

(Message 1) The prepaid subscriber 120 indicates a request to switch to prepaid by dialing a FC code, e.g. *772, and then pressing SEND.

(Message 2) Since the postpaid subscriber 120 has been provisioned at that point with a "Single Introduced Star" Origination Trigger, the MSC 106 would recognize the "*FC dialed trigger" and launch an ORREQ message to the SCP 102.

(Message 3) The prepaid/postpaid reconfiguration logic module 100 recognizes the FC and starts to process the change request. Since an old profile is found, the prepaid/postpaid reconfiguration logic module 100 may simply prompt the subscriber 120 for replenishment card number and possibly for a password. The prepaid/postpaid reconfiguration logic module 100 may formulate an ANSI-41 RUIDIR message and send it to the MSC 106 with the following parameters:

ANNLIST: Appropriate announcement to prompt the subscriber for the replenishment card number, e.g. "Please enter your replenishment card number".

DIGICC: Digits Collection control, e.g. 16 digits.

(Message 4) At the reception of the RUIDIR message, the MSC 106 plays an appropriate announcement and waits for subscriber input.

(Message 5) The subscriber 120 enters the requested digits.

(Message 6) The MSC 106 acknowledges receipt of the RUIDIR message to the SCP 102 with the collected digits. Messages 3 to 6 can be repeated until all information is collected.

(Message 7) If replenishment validation is successful, the prepaid/postpaid reconfiguration logic module 100 sends a profile change request message—such as the ANSI-41 MODIFY, or other profile change request message (e.g., a TCP/IP message)—to the HLR 104 to replace in the subscriber's profile the Origination Trigger Type "Single Introduced Star" with a Trigger Type "All Call", and to add an Advanced Termination Trigger, as well as other required prepaid triggers to the subscriber's profile.

(Message 8) The HLR 104 processes the change request and acknowledges the SCP 102 with a modify return result message in the case of ANSI-41, or with another profile change acknowledgement in the case of a TCP/IP or other proprietary or non-standard message.

(Message 9) The subscriber profile changes cause the HLR 104 to send an ANSI-41 QUALDIR message to the MSC (VLR) 106 with the updated subscriber profile.

(Message 10) The MSC 106 updates the VLR with the new subscriber profile and responds with a QUALDIR return result message. From then on, all calls from and to the subscriber 120 are processed as prepaid calls.

(Message 11) The prepaid/postpaid reconfiguration logic module 100 formulates an ORREQ return result message with an appropriate announcement and results (i.e., accepted or denied) and sends it to the MSC 106. An appropriate confirmation announcement is played to the subscriber 120. At that point, the connection between the mobile device 120 and the wireless network 150 is terminated. Thereafter, the subscriber can use the mobile phone as a prepaid calling device.

Since the whole process (from Message 2 to Message 13) can be long, it may be necessary to inform the MSC of the update status, to avoid ORREQ timer expiration. To avoid this problem, a RESETTIMER message can be sent periodically during this time.

Option 2—Postpaid to Prepaid Change of Subscriber Class, IP Method

Figure 5:
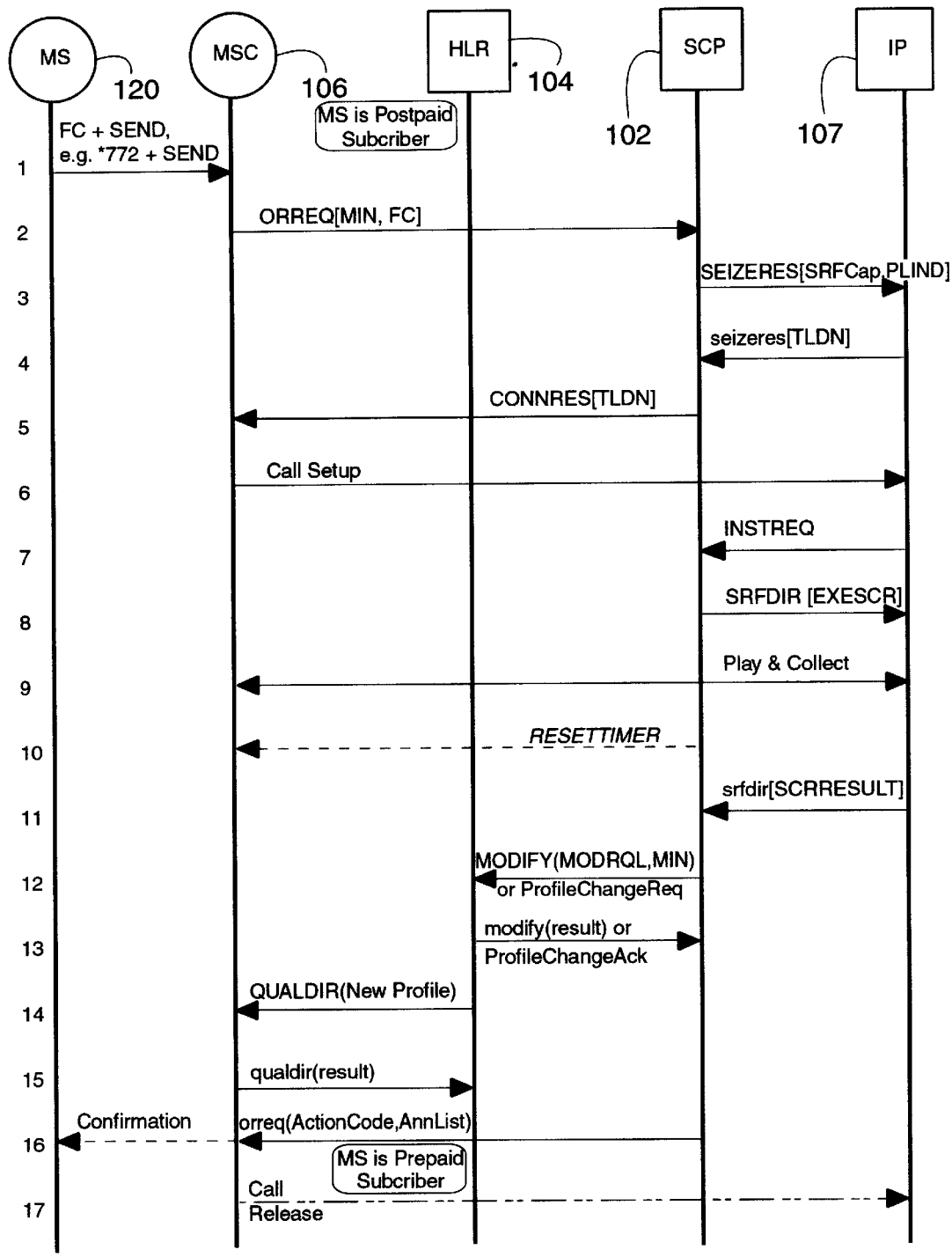
FIG. 5 shows a second embodiment of a call flow for changing a subscriber's class from postpaid to prepaid, in accordance with the principles of the present invention.

FIG. 5 shows an exemplary call flow for changing a subscriber's class from postpaid to prepaid, in accordance with the principles of the present invention.

In particular, FIG. 5 shows an exemplary message flow resulting from a subscriber 120 who desires to change their payment option from postpaid to prepaid using an IVR or IP method. In accordance with the principles of the present invention, the prepaid/postpaid reconfiguration logic module 100 treats such a request as a new subscriber if the subscriber mobile identification number (MIN) is not found in the database. If this is the case, the prepaid/postpaid reconfiguration logic module 100 has the option of routing the call to the IP 107 to perform service activation.

(Message 1) The prepaid subscriber 120 wishes to switch to prepaid and, e.g., dials a FC code, e.g. *772, and presses SEND.

(Message 2) Since the postpaid subscriber 120 has been provisioned with a "Single Introduced Star" Origination Trigger, the MSC 106 will recognize the "*FC dialed trigger", and an ORREQ message is launched to the SCP 102.

(Message 3) The prepaid/postpaid reconfiguration logic module 100 recognizes the FC and starts to process the change request. Since no existing profile is found, the prepaid/postpaid reconfiguration logic module 100 consider this as a new subscriber and attempts to seize an IP resource for the activation process, e.g., by sending a SEIZERES message to the IP 107.

(Message 4) The IP 107 reserves a Local Temporary Directory Number (TLDN) and includes this in the response message SEIZERES to the SCP 102.

(Message 5) The SCP 102 sends, e.g., a CONNRES message to instruct the MSC 106 to route the call to the IP 107 based on the TLDN.

(Message 6) The MSC 106 analyzes the TLDN and sets up the call to the IP 107.

(Message 7) At the reception of the call setup request from the MSC 106, the IP 107 sends an INSTREQ message to the SCP 102 to request a next instruction.

(Message 8) The SCP 102 orders the IP 107 using an SRFDIR message to play and collect the data needed to setup a new prepaid account, e.g., replenishment card number, PIN, and user preferences.

(Message 9) The subscriber 120 enters the requested information.

(Message 10) In the case where extended time is needed, the prepaid/postpaid reconfiguration logic module 100 may prolong a timeout in the MSC 106 by sending a RESET-TIMER message to the MSC 106.

(Message 11) The IP 107 forwards the collected digits with the SRFDIR message to the SCP 102. Messages 8 to 11 can be repeated until all information is collected. The last SRFDIR message preferably indicates with an appropriate parameter that digits collection is completed.

(Message 12) If replenishment validation is successful, the prepaid/postpaid reconfiguration logic module 100 sends a profile change request message—such as the ANSI-41 MODIFY, or other profile change request message (e.g., a TCP/IP based message)—to the HLR 104 to replace in the subscriber's profile the Origination Trigger Type "Single Introduced Star" with a Trigger Type "All Call", and to add an Advanced Termination Trigger, as well as other required prepaid triggers to the subscriber's profile.

(Message 13) The HLR 104 processes the change request and acknowledges the SCP 102 with a modify return result message in the case of ANSI-41, or with another profile change acknowledgement message, e.g., in the case of a proprietary TCP/IP based message.

(Message 14) The subscriber profile changes cause the HLR 104 to send an ANSI-41 QUALDIR message to the MSC 106 (VLR) with an updated subscriber profile.

(Message 15) The MSC 106 updates the VLR with the new subscriber profile, and responds with a QUALDIR return result message. From then on, all calls from and to the subscriber 120 are processed as prepaid calls.

(Message 16) The prepaid/postpaid reconfiguration logic module 100 formulates an ORREQ return result message with an action code to "disconnect the call", along with an appropriate announcement and a result (i.e., accepted or denied) and sends it to the MSC 106. An appropriate confirmation announcement is then played to the subscriber 120.

(Message 17) The call to the IP 107 is released. The connection between the mobile device 120 and the wireless network 150 is terminated. At that point, the subscriber can use the mobile device in a prepaid mode.

The principles of the present invention have applicability for usage with wireless intelligent network (WIN) applications, e.g., those already otherwise containing a short message servicing center (SMSC), a prepaid and/or an Internet gateway application. Moreover, since the disclosed techniques and apparatus do not require customer care representative intervention, subscribers have full control of payment option switching. This allows service providers to reduce expenses and overhead, and at the same time collect additional revenue by, e.g., optionally applying a surcharge every time the payment option service is switched.

While the invention has been described with reference to the exemplary embodiments thereof, those skilled in the art will be able to make various modifications to the described embodiments of the invention without departing from the true spirit and scope of the invention.

What is claimed is:

1. A method of allowing a wireless device to change its prepaid payment mode substantially in real-time, comprising:

provisioning at least one trigger in a wireless subscriber's profile file relating to a prepaid mode for said wireless device;

removing said at least one trigger from said wireless subscriber's profile file in response to keyed input from said wireless device, said removing switches said subscriber's profile file between said prepaid mode and a postpaid mode; and adding said at least one trigger to said wireless subscriber's profile file in response to keyed input from said wireless device, said adding switches said subscriber's profile file between said prepaid mode and said postpaid mode.

2. The method of allowing a wireless device to change its prepaid payment mode substantially in real-time according to claim 1, wherein said keyed input from said wireless device comprises:

a feature code followed by a SEND signal.

3. The method of allowing a wireless device to change its prepaid payment mode substantially in real-time according to claim 1, further comprising:

storing a subscriber's profile in a home location register (HLR).

4. The method of allowing a wireless device to change its prepaid payment mode substantially in real-time according to claim 1, wherein said at least one trigger comprises:

a WIN Origination Trigger having type "All Calls".

5. The method of allowing a wireless device to change its prepaid payment mode substantially in real-time according to claim 4, wherein said at least one trigger further comprises:

a WIN advanced termination trigger.

6. The method of allowing a wireless device to change its prepaid payment mode substantially in real-time according to claim 4, wherein said at least one trigger further comprises:

a WIN call answer trigger.

7. The method of allowing a wireless device to change its prepaid payment mode substantially in real-time according to claim 4, wherein said at least one trigger further comprises:

a WIN call disconnection trigger.

8. The method of allowing a wireless device to change its prepaid payment mode substantially in real-time according to claim 1, wherein:

said method utilizes only wireless intelligent network (WIN) messaging.

9. The method of allowing a wireless device to change its prepayment mode substantially in real-time according to claim 1, wherein:

said provisioning and said removing steps may each be performed on a call-by-call basis by said wireless device.

10. Apparatus for allowing a wireless device to change its prepaid payment mode substantially in real-time, comprising:

means for provisioning at least one trigger in a profile file relating to a prepaid mode for said wireless device; and means for removing said at least one trigger upon initiation by a user of said wireless device from said profile file in response to keyed input from said wireless device, whereby removing said at least one trigger switches between a prepaid mode and a postpaid; and means for adding said at least one trigger upon initiation by said user of said wireless device to said profile file in response to keyed input from said wireless device, whereby adding said at least one trigger switches between said prepaid mode and said postpaid mode.

11. The apparatus for allowing a wireless device to change its prepaid payment mode substantially in real-time according to claim 10, wherein:

said means for provisioning is activated in response to a feature code initiated by said wireless device.

12. The apparatus for allowing a wireless device to change its prepaid payment mode substantially in real-time according to claim 10, further comprising:

means for storing a subscriber's profile in a home location register (HLR).

13. The apparatus for allowing a wireless device to change its prepaid payment mode substantially in real-time according to claim 12, wherein:

communications between said wireless device and said means for provisioning consists of wireless intelligent network (WIN) messaging.

14. The apparatus for allowing a wireless device to change its prepayment mode substantially in real-time according to claim 12, wherein:

said means for provisioning and said means for removing may each be activated on a call-by-call basis by said wireless device.

15. The apparatus for allowing a wireless device to change its prepaid payment mode substantially in real-time according to claim 10, wherein:

said means for provisioning said at least one trigger provisions a WIN origination trigger having type "All Calls".

16. The apparatus for allowing a wireless device to change its prepaid payment mode substantially in real-time according to claim 15, wherein:

said means for provisioning said at least one trigger further provisions a WIN advanced termination trigger.

17. The apparatus for allowing a wireless device to change its prepaid payment mode substantially in real-time according to claim 15, wherein:

said means for provisioning said at least one trigger further provisions a WIN call answer trigger.

18. The apparatus for allowing a wireless device to change its prepaid payment mode substantially in real-time according to claim 15, wherein:

said means for provisioning said at least one trigger further provisions a WIN call disconnection trigger.

* * * * *

UNITED STATES PATENT AND TRADEMARK OFFICE
CERTIFICATE OF CORRECTION

PATENT NO. : 6,785,534 B2  Page 1 of 4
APPLICATION NO. : 09/832011
DATED : August 31, 2004
INVENTOR(S) : Ung It is certified that error appears in the above-identified patent and that said Letters Patent is hereby corrected as shown below:

Insert into

" (56) References Cited" Section:

| | | |
|---|---|---|
| 5,740,534, | 4/1998, | Ayerst et al. |
| 6,266,614. | 7/2001, | Alumbaugh |
| 5,673,306, | 9/1997, | Amadon et al. |
| 6,148,198, | 11/2000, | Anderson et al. |
| 5,579,372, | 11/1996, | Astrom |
| 5,943,399, | 8/1999, | Bannister et al. |
| 6,101,378, | 8/2000, | Barabash et al. |
| 6,148,197, | 11/2000 | Bridges et al. |
| 6,226,529, | 5/2001, | Bruno et al. |
| 5,950,130, | 9/1999, | Coursey |
| 5,974,054, | 10/199, | Couts et al. |
| 6,122,503, | 9/2000, | Daly |
| 5,802,492, | 9/1998, | DeLorme et al. |
| 6,289,373, | 9/2001, | Dezonno |
| 6,075,982, | 6/2000, | Donovan et al. |
| 5,692,037, | 11/1997, | Friend |
| 6,198,431, | 3/2001, | Gibson |
| 6,199,045, | 3/2001 | Giniger et al. |
| 6,169,891, | 1/2001, | Gorham et al. |
| 6,181,935, | 1/2001, | Gossman et al. |
| 6,317,594, | 11/2001, | Gossman et al. |
| 5,768,509, | 6/1998, | Gunluk |
| 6,223,046, | 4/2001, | Hamill-Keays et al. |
| 6,035,025, | 3/2000, | Hanson |
| 6,058,000, | 5/2000, | Hanson |
| 5,953,398, | 9/1999, | Hill |
| 5,797,094 | 8/1998, | Houde et al. |
| 5,822,700, | 10/1998, | Hult et al. |
| 5,987,323, | 11/1999, | Huotari |
| 4,706,275, | 11/1987, | Kamil |
| 5,828,740, | 10/1998, | Khuc et al. |
| 5,592,535, | 1/1997, | Klotz |
| 5,351,235, | 9/1994, | Lahtinen |
| 5,978,685, | 11/1999, | Laiho |
| 6,188,752, | 2/2001, | Lesly |
| 6,173,181, | 1/2001, | Losh |

UNITED STATES PATENT AND TRADEMARK OFFICE
CERTIFICATE OF CORRECTION

| | |
|---|---|
| PATENT NO. | : 6,785,534 B2 |
| APPLICATION NO. | : 09/832011 |
| DATED | : August 31, 2004 |
| INVENTOR(S) | : Ung |

Page 2 of 4

It is certified that error appears in the above-identified patent and that said Letters Patent is hereby corrected as shown below:

| | | |
|---|---|---|
| 5,797,096, | 8/1998, | Lupien et al. |
| 5,761,618, | 6/1998, | Lynch et al. |
| 5,068,891, | 11/1991, | Marshall |
| 6,327,479, | 12/2001, | Mikkola |
| 5,999,811, | 12/1999, | Molne |
| 6,064,875, | 5/2000, | Morgan |
| 6,249,744, | 6/2001, | Morita |
| 6,070,067, | 5/2000 | Nguyen et al. |
| 6,049,710, | 4/2000, | Nilsson |
| 6,149,353, | 11/2000, | Nilsson |
| 5,774,533, | 6/1998, | Patel |
| 6,369,913, | 5/2002, | Perkins, III |
| 6,208,854, | 3/2001, | Roberts et al. |
| 5,905,736, | 5/1999, | Rohen et al. |
| 5,628,051, | 5/1997, | Salin |
| 5,682,600, | 10/1997, | Salin |
| 5,787,357, | 6/1998, | Salin |
| 5,946,629, | 8/1999, | Sawyer et al. |
| 5,920,821, | 6/1999, | Seaholtz et al. |
| 5,767,795, | 6/1998, | Schaphorst |
| 5,930,701, | 7/1999, | Skog |
| 5,794,142, | 8/1998, | Vanttila et al. |
| 5,806,000, | 9/1998, | Vo et al. |
| 6,122,520, | 9/2000, | Want et al. |
| 6,249,680, | 6/2001, | Wax et al. |
| 6,081,508, | 6/2000, | West et al. |
| 5,946,630, | 8/1999, | Willars et al. |
| 6,205,330, | 3/2001, | Winbladh |
| 5,797,091, | 8/1998, | Clise et al. |
| 5,343,493, | 8/1994, | Karimullah |
| 5,479,482, | 12/1995, | Grimes |
| 5,519,403, | 5/1996, | Bickley et al. |
| 5,535,434, | 7/1996, | Siddoway et al. |
| 4,891,638, | 1/1990, | Davis |
| 5,070,329, | 12/1991, | Jasinaki |
| 5,068,656, | 11/1991, | Sutherland |
| 5,119,104, | 6/1992, | Heller |
| 5,177,478, | 1/1993, | Wagai et al. |
| 5,363,425, | 11/1994, | Mufti et al. |
| 5,387,993, | 2/1995, | Heller et al. |
| 5,485,163, | 1/1996, | Singer et al. |

UNITED STATES PATENT AND TRADEMARK OFFICE
CERTIFICATE OF CORRECTION

PATENT NO. : 6,785,534 B2
APPLICATION NO. : 09/832011
DATED : August 31, 2004
INVENTOR(S) : Ung It is certified that error appears in the above-identified patent and that said Letters Patent is hereby corrected as shown below:

```
5,479,408,   12/1995,   Will
5,497,149,   3/1996,    Fast
5,513,243,   4/1996,    Kage
5,588,009,   12/1996,   Will
5,604,486,   2/1997,    Lauro et al.
5,606,313,   2/1997,    Allen et al.
5,614,890,   3/1997,    Fox
4,494,119,   1/1985,    Wimbush
4,651,156,   3/1987,    Martinez
4,891,650,   1/1990,    Sheffer
5,014,206,   5/1991,    Scribner et al.
5,055,851,   10/1991,   Sheffer
5,208,756,   5/1993,    Song
5,218,367,   6/1993,    Sheffer et al.
5,223,844,   6/1993,    Mansell et al.
5,289,527,   2/1994,    Tiedemann, Jr.
5,293,642,   3/1994,    Lo
5,379,451,   1/1995,    Nakagoshi et al.
5,347,568,   9/1994,    Moody et al.
5,374,936,   12/1994,   Feng
5,390,339,   2/1995,    Bruckert et al.
5,394,158,   2/1995,    Chia
5,398,190,   3/1995,    Wortham
5,406,614,   4/1995,    Hara
5,423,076,   6/1995,    Westergreen et al.
5,432,841,   7/1995,    Rimer
4,952,928,   8/1990,    Carrol et al.
5,214,789,   5/1993,    George
5,266,944,   11/1993,   Carrol et al.
5,325,302,   6/1994,    Izidon et al.
5,361,212,   11/1994,   Class et al.
5,381,338 ,  1/1995,    Wysocki et al.
5,369,227,   3/1995,    Carroll et al.
5,418,537,   5/1995,    Bird
5,434,789,   7/1995,    Fraker et al.
5,461,390,   10/1995,   Hoshen
5,470,233,   11/1995,   Fuchterman et al.
5,485,161,   1/1996,    Vaughn
5,488,563,   1/1996,    Chazelle et al.
5,508,931,   4/1996,    Snider
```

UNITED STATES PATENT AND TRADEMARK OFFICE
CERTIFICATE OF CORRECTION

PATENT NO. : 6,785,534 B2
APPLICATION NO. : 09/832011
DATED : August 31, 2004
INVENTOR(S) : Ung It is certified that error appears in the above-identified patent and that said Letters Patent is hereby corrected as shown below:

```
5,515,287,  5/1996,   Hakoyama et al.
5,532,690,  7/1996,   Hertel
5,539,398,  7/1996,   Hall et al.
5,552,772,  9/1996,   Janky et al.
5,568,119,  10/1996,  Schipper et al.
5,574,648,  11/1996,  Pilley
5,606,850,  3/1997,   Nakamura
5,610,815,  3/1997,   Gudat et al.
5,615,116,  3/1996,   Gudat et al.
5,621,793,  4/1997,   Bednarak et al.
5,235,630,  8/1993,   Moodey et al.
5,543,776,  8/1996,   L'Esperance et al.
5,633,912,  5/1997,   Tsoi
5,454,024,  9/1995,   Lebowitz
5,334,974,  8/1994,   Simms et al.
5,299,132,  3/1994,   Wortham
5,193,215,  3/1993,   Olmer
5,144,283,  9/1992,   Arens et al.
5,555,286,  9/1996,   Tendler
5,388,147,  2/1995,   Grimes
5,081,667,  1/1992,   Drori et al.
1,103,073,  7/1914,   O'Connel
5,043,736,  8/1991,   Darnell et al.
5,161,180,  11/1992,  Chavous
5,239,570,  8/1993,   Koster et al.
```

Signed and Sealed this

Seventeenth Day of April, 2007

JON W. DUDAS
*Director of the United States Patent and Trademark Office*